Feb. 2, 1954 — R. W. HEATH — 2,667,748
ELECTRICALLY OPERATED CONTROL SYSTEM
Filed March 4, 1953 — 3 Sheets-Sheet 1

ROY W. HEATH
INVENTOR
HUEBNER, BEEHLER, WORREL & HERZIG
ATTORNEYS

Feb. 2, 1954            R. W. HEATH           2,667,748
ELECTRICALLY OPERATED CONTROL SYSTEM
Filed March 4, 1953                             3 Sheets-Sheet 2
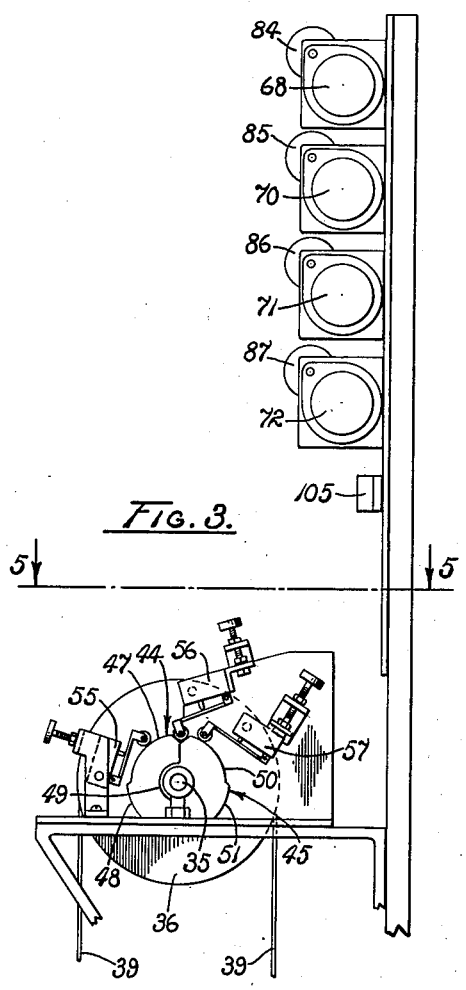
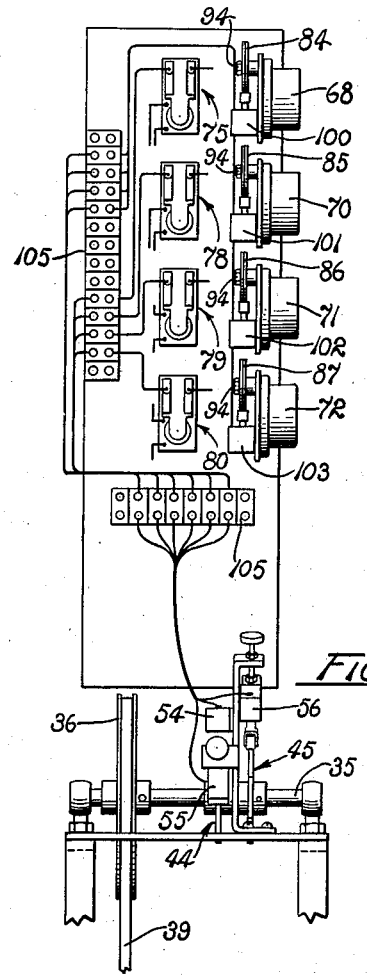
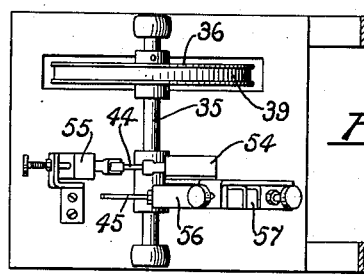
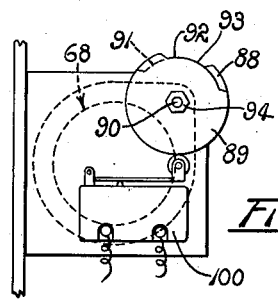
ROY W. HEATH
INVENTOR
HUEBNER, BEEHLER,
WORREL & HERZIG
ATTORNEYS
BY

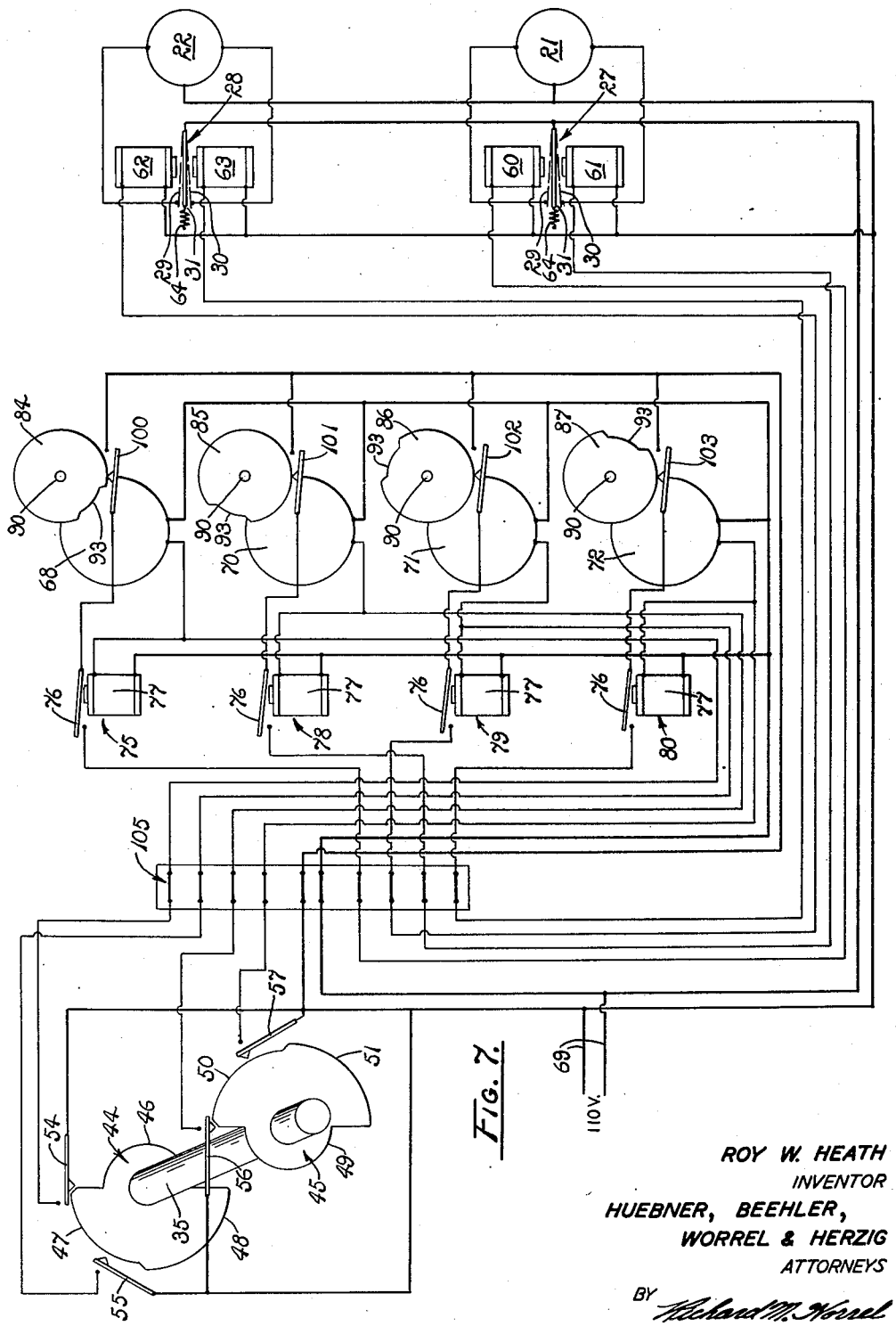

Patented Feb. 2, 1954

2,667,748

UNITED STATES PATENT OFFICE 2,667,748

ELECTRICALLY OPERATED CONTROL SYSTEM

Roy W. Heath, Fresno, Calif.

Application March 4, 1953, Serial No. 340,207

8 Claims. (Cl. 61—25)

The present invention relates to an electrically operated control system and more particularly to such a system adapted to exercise its control in periodic time-spaced pulses.

It has been known to detect fluctuations of innumerable variable factors by mechanical and electrical means and automatically to apply corrective measures upon departure of such factors from predetermined desired limits. In several such systems, the corrective measures are of progressively accelerated effect for so long as the variable requires correction and upon return of the variable to desired range a considerable period is required to bring to a halt continuing effects of corrective measures. As a result, overcontrol is exerted and countercorrective measures are required resulting in needless and undesirable cyclical correction and counter-correction, usually referred to as "hunting."

Athough the elimination of accelerated correction or the reduction in rate of acceleration or even the speed of correction would appear to provide a solution, many variable factors require speedy and in some instances accelerated corrective measures. The broad essence of the present invention resides in the discovery that the advantages of high speed and even accelerated corrective measures can in main be retained and the disadvantages of over-control and hunting largely eliminated by exercising such corrective measures in time spaced increments enabling improved detection and automatic evaluation of the need of successive correction.

For example, irrigation canal systems usually provide successive stages along the canals defined by dams above which it is desired to maintain water at a predetermined level to supply outlets from the canals. Although fluctuations can be tolerated within reasonable limits, excessive fluctuations make proper delivery to the outlets impossible. Variations in water supply to the canal, modifications of quantities of water delivered from the canal, and changes in the amounts of water permitted to flow through other dams along the canal requires continual vigilance at each dam and frequent adjustment and readjustment of the permissive flow therethrough. On large irrigating canal projects attendants constantly are on duty at each dam or head gate to perform the requisite control. Not only is the hiring of the numerous attendants expensive but the performance of their duties is subject to human errors which have made it desirable to employ less expensive and more dependable means.

Experimental control systems for the purpose have largely consisted of float means for detecting water levels above the dams, gates in the dams, electric motors in controlling connection to the gates, and electrical systems connected to the motors which continue to open the gates when the water levels above the dams are too high and continue to close the gates when such levels are too low. The continual opening of the gates and the continual closing of the gates during opposite departures from desired operating range constitutes accelerated corrective measures and the objectionable hunting occurs. If the hunting of the experimental control systems is avoided by providing that the gates open and close to predetermined settings, the resultant operation is too inflexible to perform properly under the varied operating requirements encountered.

An object of the present invention is to provide an improved automatic control system for variable factors.

Another object is to provide a control system adapted to detect fluctuations in variable factors and automatically to apply corrective measures upon departures of such factors from predetermined desired limits.

Another object is to provide a control system of the character described that minimizes or obviates the cyclical over-correcting and counter-correcting, referred to as hunting.

Another object is to provide a control system adapted to detect fluctuations in variable factors and automatically to apply corrective measures upon departures of such factors from predetermined desired limits in time spaced increments.

Another object is to provide a fully effective control system for canals and the like.

Another object is to minimize canal operating expenses by reducing the number of attendants required.

Further objects are to provide improved elements and arrangements thereof in a device of the character and for the purposes set forth.

Other objects and advantages will become apparent in the subsequent description of the present invention as illustrated in the drawings in which:

Fig. 3 is an enlarged elevation of a portion of the control system shown in the float well of Fig. 2.

Fig. 4 is a front elevation of the portion of the system shown in Fig. 3.

Fig. 5 is a horizontal section and plan view taken on line 5—5 of Fig. 3.

Fig. 6 is a somewhat enlarged fragmentary side elevation of a timing cam and increment switch associated therewith, shown in Fig. 4.

Fig. 7 is a diagram of an electrical system utilized in the form of the present invention illustrated in the preceding figures having associated mechanical elements schematically represented therewith for illustrative convenience.

Figure 1:
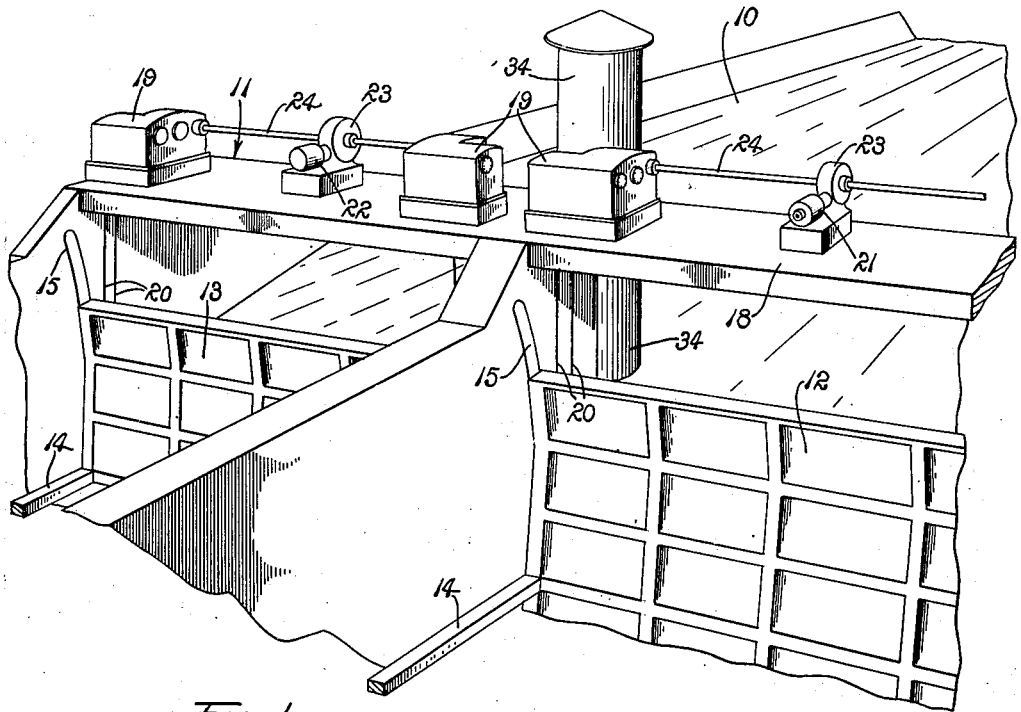
Fig. 1 is a fragmentary perspective of a canal having a check-dam therein with which the automatic control system of the present invention is employed.
Figure 2:
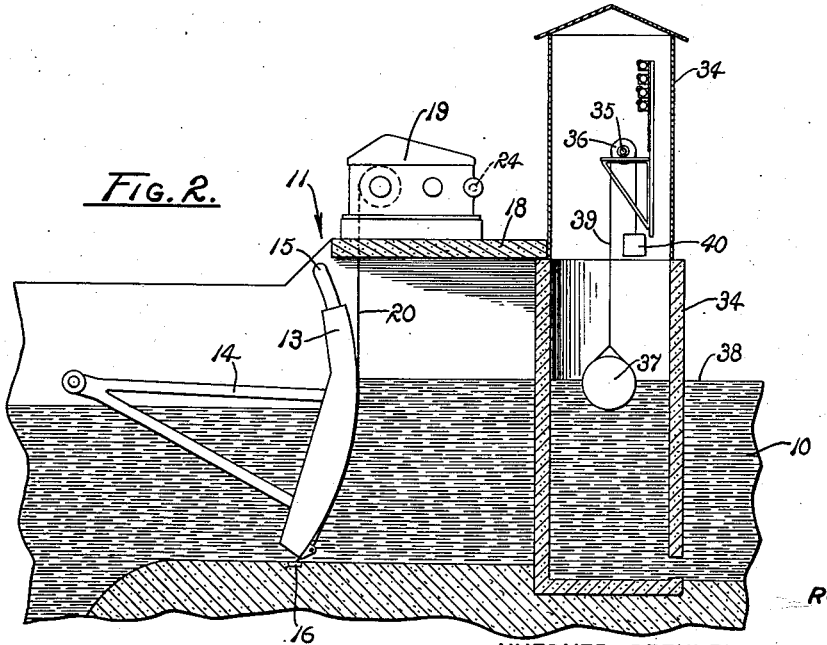
Fig. 2 is a vertical section through the dam longitudinally of the canal. As part of the dam structure, a float well is shown in Fig. 2 in vertical section in which a portion of the control system of the present invention is shown in elevation.

Referring in greater detail to the drawings:

A suitable environment for the control system of the present invention is illustrated in Figs. 1 and 2 consisting of a canal 10 having a checkdam 11 therein. The dam employs a primary radial gate 12 and a secondary radial gate 13 mounted for pivotal elevational movement on radius arms 14. The gates are guided in arcuate channels 15 in the dam between elevated and lowered positions. When lowered, the gates rest upon sill plates 16 individual thereto and effectively preclude the flow of water through the dam.

The dam 11 provides a cross walk 18 above the gates 12 and 13 on which winches 19 are mounted. The winches are connected to opposite ends of the gates by elevating cables 20. The winches are independently reversibly driven to raise and to lower their respective gates by means of a pair of reversible electric motors 21 and 22 having driving connection to their respective winches by means of transmissions 23 and drive shafts 24. The motor 21 which controls the elevation of the primary gate 12 is referred to as the primary motor and the motor 22 having controlled connection to the secondary gate 13 is referred to as the secondary motor.

As best shown in Fig. 7, the motor 21 is provided with a reversible control switch 27 and the motor 22 with a reversible switch 28. Each switch has a gate raising position indicated at 29, a lowering position shown at 30, and an open position indicated at 31. When the switch 27 or 28 is in open position 31, its respective motor is de-energized and because of the characteristics of its respective transmission 23 and winches 19, its gate 12 or 13 dependably held in adjusted position until subsequent energizing of the motor modifies its position.

Up stream from the dam 11, is a float well 34 in which is rotatably mounted a substantially horizontal shaft 35 providing a pulley 36 concentrically thereon. A buoyant float 37 is rested on the surface 38 of the body of water impounded above the dam directly below the pulley 36 and a flexible tension member 39 connected to the float and extended upwardly over the pulley. A counterweight 40 is supported on the flexible member on the opposite side of the pulley 36 from the float 7 so that the tension member is maintained in a taut condition over the pulley. As the float 37 rises and falls in conformance to the elevational movement of the surface of the water, the pulley 36 and the shaft 35 are correspondingly rotatably positioned. The structure heretofore referred to is well known and not described in greater detail.

As best shown in Figs. 3, 5 and 7, a gate raising cam 44 and a gate lowering cam 45 are mounted on the shaft 35 for unitary rotational movement therewith. The cams 44 and 45 rotate in a clockwise direction when the surface 38 of the water rises, as viewed in Figs. 2 and 7, and provide a peripheral progression counterclockwise of the cam. Similarly, the lowering cam provides a low 49, a primary high 50, and a secondary high 51 in peripheral progression clockwise thereof. It will be apparent that raising and lowering cams of various forms may be utilized but that the form shown is conveniently suited to independent actuation of the primary and secondary motors 21 and 22.

A primary raising, or gate opening, switch 54 is mounted adjacent to the raising cam 44 for engagement with the primary high 47 for movement to closed position when the cam is rotated in a clockwise direction, as reviewed in Fig. 7. A secondary raising switch 55 is mounted for engagement with the secondary high 48 so as to be closed thereby upon further rotation of the cam in a clockwise direction. Similarly, a primary lowering switch 56 and a secondary lowering switch 57 are mounted adjacent to the lowering cam 45 for successive closing action by engagement with their respective highs 50 and 51 of the cam when rotated in a counterclockwise direction, as by the lowering of the water level 38. Thus, when the raising cam is rotated in a clockwise direction from the rest position shown in Fig. 7, the primary raising switch 54 is closed and if the rotational movement is continued a sufficient distance, the secondary raising switch 55 is subsequently closed. Upon reverse rotation, the secondary raising switch is permitted to open prior to the opening of the primary raising switch. Similarly, counterclockwise rotation of the lowering cam 45 from rest position first closes the primary lowering switch 56 and subsequently the secondary lowering switch 57 upon continuance of the rotational movement.

As shown in Fig. 7, a primary raising electrical magnet 60 is operatively associated in any suitable manner with the primary reversible switch 27 so as to urge said switch into gate raising position when energized. A primary lowering electrical magnet 61 is also operatively associated with the primary reversible switch 27 so as to move the switch into gate lowering position when energized. Similarly, a secondary raising electro-magnet 62 and a secondary lowering electromagnet 63 are operatively associated with the secondary reversible switch 28 so that when independently energized they urge their switch into gate raising and gate lowering positions respectively. Each of the reversible switches 27 and 28 is preferably provided with a spring 64 or other suitable means for resiliently urging the switches into open position.

An electrically operated primary raising timing motor 68 is connected electrically in series with the primary raising switch 54 and a source of electrical energy 69. Similarly, a primary lowering timing motor 70, a secondary raising timing motor 71, and a secondary lowering timing motor 72 are individually electrically connected in series with the secondary raising switch 55, the primary lowering switch 56, and the secondary lowering switch 57 respectively and with the source of electrical energy 69.

A primary raising relay 75 having switching means 76 and a closing coil 77 is connected with its closing coil electrically in parallel with the timing motor 68. A primary lowering relay 78, a secondary raising relay 79, and a secondary lowering relay 80 are individually connected with their respective closing coils in parallel with the timing motors 70, 71 and 72 respectively. For simplification, corresponding elements of the relays 75, 78, 79 and 80 are identified by corresponding numerals. It will be apparent that whenever one of the timing motors is actuated by the closing of its respective control switch, the closing coil 77 of its respective relay is also actuated to close the switching means 76 operatively associated therewith.

Timing cams 84, 85, 86 and 87 are individually rotatably driven by the timing motors 68, 70, 71 and 72 respectively. Each of the cams preferably consists of a pair of plates 88 and 89 rotatably mounted in facing engagement substantially concentrically on the drive shaft 90 of their respective timing motor. The plates are peripherally relieved at 91 and at 92 respectively so as to define a peripheral notch 93 therebetween of adjustable peripheral extent by relative rotational positioning of the plates. The plates 88 and 89 are releasably held in adjusted relation on their respective shafts 90 by means of nuts 94 screwthreadedly mounted on the shaft on opposite sides of the plate. Such mounting also assures unitary rotational movement of the plates constituting the cams 84, 85, 86 and 87 with their respective shafts 90.

Increment switches 100, 101, 102 and 103 are individually mounted adjacent to the cams 84, 85, 86 and 87 respectively in engagement with the peripheries thereof. As the cams are rotated, their respective increment switches are held in open position until received in the notches 93 whereupon said switches are closed for an increment of time whose duration is adjustable by the determination of the peripheral length of the notches regulated by relative rotational adjustment of the plates 88 and 89. The increment switch 100 operated by the timing cam 84 is connected electrically in series with the switching means 76 of the primary relay 75 and the primary raising electro-magnet 60 with the source of electrical energy 69. Similarly, the increment switch 101 is connected in series with the switching means of the primary lowering relay 78, the primary lowering electro-magnet 61, and the source of electrical energy. The increment switch 102 is connected electrically in series with the switching means of the secondary raising relay 79, the secondary raising electro-magnet 62 and the source of electrical energy. The increment switch 103 is connected electrically in series with the switching means of the secondary lowering relay 80, the secondary lowering electro-magnet 63, and the source of electrical energy.

A junction panel is shown at 105 and constitutes a well known electrical connecting convenience which is not essential to the control system of the present invention.

Operation

The operation of the system of the present invention is believed to be clearly apparent and is briefly summarized at this point. During normal operation of the canal 10 when the level of the water 38 is between predetermined desired upper and lower limits thereof, the raising cam 44 and the lowering cam 45 are centrally located in rest position so that the switches 54, 55, 56 and 57 are open. In this condition, the reversible switches 27 and 28 are urged into open position 31 by the spring 64 and the gates 12 and 13 are held in adjusted position.

When the level of the water 38 rises above the uppermost predetermined desired limit, the flexible tension member 39 rotates the pulley 36 and the shaft 35 in a clockwise direction, as viewed in Figs. 1, 3 and 7 until the primary high 50 of the raising cam 44 closes the primary raising switch 54. The closing of the switch 54 energizes the primary timing motor 68 which rotates the cam 84. As the cam 84 is synchronously rotated, the increment switch 100 engaged therewith is periodically closed for predetermined increments of time by passage of the notch 93 therepast. It will be recalled, that the closing coil 77 of the relay 75 is actuated concurrently with the energizing of the timing motor 68 closing the switching means 76 of said relay. Thus, whenever the increment switch 100 is closed, the circuit is completed through the switching means 76 of the relay 75 to the primary raising electro-magnet 60 and the reversible switch 27 moved into gate raising position shown at 29. When the switch 27 is in gate raising position 29, the primary motor 21 is motivated in a direction rasing the primary gate 12 by means of the winches 19 connected thereto. As long as the primary motor 21 continues to run in such direction, the primary gate 12 continues to be raised. It will be obvious that the continual opening of the gate has an accelerated corrective effect in reducing the body of water impounded by the dam so that the level thereof is lowered. The motor 21, however, runs for only brief, time spaced, predetermined increments under the control of its timing cam and thus the over-control previously discussed is substantially avoided.

If the quantities of water delivered to the canal 10 above the dam 11 is such that the primary gate cannot sufficiently rapidly reduce the level of water, the shaft 35 will continue to rotate in a clockwise direction, as shown in Fig. 7 until the secondary high 51 closes the secondary raising switch 55. When this occurs, the secondary raising timing motor 71 is energized and the cam 86 rotated so that the increment switch 102 is periodically opened and closed. Whenever the increment switch 102 is closed, the secondary raising electro-magnet 62 is energized through the switching means 76 of the secondary raising relay 79 and the secondary reversing switch 28 positioned in gate raising attitude shown at 29. As a result, the secondary motor 22 is operated to raise the secondary gate 13.

As the level of the water above the dam decreases to within the desired limits, the shaft 35 is rotated in a counterclockwise direction, as viewed in Figs. 2 and 7, successively opening the secondary raising switch 55 and the primary raising switch 54 thus successively terminating operation of the motors 21 and 22 in their respective gate raising operations.

Further decrease in water level below the predetermined lower limit desired, rotates the shaft 35 and the cams 44 and 45 in a counterclockwise direction, as viewed, successively closing the primary lowering switch 56 and the secondary switch 57. If the corrective effect of closing the primary switch is adequate, the counterclockwise rotation of the lowering cam will not continue a sufficient distance to close the secondary lowering switch. The gate lowering circuits described operate in the same manner as the gate raising circuit. Upon the closing of a lowering switch 56 or 57, its respective timing motor 70 or 72 is energized together with the closing coil 77 of its respective relay 78 or 80. Whenever the secondary increment switches 101 or 103 are closed while the switching means 76 operatively associated therewith are closed, a circuit is established to the electro-magnets 61 and 63 respectively connected in series therewith and the reversing switch 27 and 28 respectively moved to lowering position 30 whereupon the motors 21 and 22 respectively controlled thereby operate to lower their respective gates 12 and 13. The timing motors 69, 70, 71 and 72 operate only when their respective control switches 54, 55, 56 or 57 are closed. It thus is possible for the timing cams 84, 85, 86 or 87 to be stopped in a position with their respective increment switches 100, 101, 102 and 103 in closed position. When this occurs, no harm is done and the desired operation of the system is not modified inasmuch as the closing coils 77 are de-energized concurrently with deenergization of their associated timing motors so that the switching means 76 are opened. Said switching means being in series with their respective increment switches precludes inadvertent operation of the electro-magnets and the motors 21 and 22.

While the subject invention has been described in terms of the employment of a primary and a secondary controlling system which makes possible desired cooperative and supplemental action, it will be apparent that only a single such system need be utilized in many situations and that any desired plurality of such systems may be cooperatively employed where operating requirements make it advisable. It will also be appreciated that although the automatic control system of the present invention has been described in connection with the automatic regulation of fluid level in a canal, the system may readily be made responsive to the detection of fluctuations innumerable variable factors by mechanical or electrical means or the like and to provide for the automatic application of suitable corrective measures upon departure of such factors from predetermined desired limits with the corrective measures being applied in time spaced increments so as to avoid the tendencies for excessive cyclical over-correcting and counter-correcting or hunting.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices, systems and apparatus.

Having described my invention, what I claim as new and desire to secure by Letters Patent is:

1. A fluid regulating system comprising means for detecting the surface level of a body of fluid subject to fluctuation by accretion and depletion of the fluid, electrically controlled means for increasing and decreasing the quantity of fluid in the body to correct for excessive accretion and depletion, switch means having controlled connection to the detecting means and controlling connection to the controlled means operable to decrease the fluid in the body when the level rises above a predetermined upper limit and to increase the fluid in the body when the level descends below a predetermined lower limit in downwardly spaced relation to the upper limit, and timing means in the electrical system adapted to interrupt the system in time spaced increments of predetermined duration.

2. A fluid level regulating system comprising means for detecting the surface level of a body of fluid, a raising switch operatively associated with the detection means closed by decrease in fluid level below a predetermined limit, a lowering switch operatively associated with the detection means closed by increase in fluid level above a predetermined limit, electrically controlled means for increasing and decreasing the quantity of fluid in the body thereof, an electrical system including the switches and the electrically controlled means to increase the quantity of fluid in the body thereof when the raising switch is closed and to decrease the quantity of fluid when the lowering switch is closed, and timing means in the electrical system actuated by closing of either of the switches adapted to interrupt the electrical system for periodic time spaced increments.

3. In combination with a dam having water impounded thereabove and providing a gate openable to discharge water past the dam, electrically controlled means for opening and closing the gate, float means for detecting the level of the water impounded by the dam, a gate opening switch operatively associated with the detection means closed by increase in water level above a predetermined limit, a gate closing switch operatively associated with the detection means closed by decrease in water level below a predetermined limit, an electrical system including the switches and the electrically controlled means adapted to actuate the electrically controlled means to open the gate when the gate opening switch is closed and to close the gate when the gate opening switch is closed, and timing means in the electrical system adapted to interrupt the system for periodically spaced predetermined increments of time.

4. A fluid level responsive automatic control system comprising means for detecting surface level of a body of fluid; a cam control shaft operatively associated with the detecting means and rotatably positioned in response to fluid level variations; cam means mounted on the shaft and rotatable therewith; a raising switch engageable by the cam means upon rotation of the cam means to a predetermined position to close the switch; a lowering switch engageable by the cam means upon opposite rotation of the cam means to a predetermined position to close the lowering switch; a pair of electrical timing motors individually electrically connected in series with the switches to a source of electrical energy; a pair of relays each having a closing coil and switching means controlled by the closing coil, the closing coils being individually connected electrically in parallel with their respective timing motors; a pair of timing cams individually mounted on the timing motors for rotation thereby; an increment switch operatively associated with each timing cam periodically opened and closed by rotation of its respective cam; electrically operated means for increasing the quantity of fluid in the body whose level is detected by the detecting means electrically connected in series with the increment switch actuated by the timing motor connected to the raising switch, the switching means of the relay in parallel to said timing motor, and a source of electrical energy; and electrically operated means for decreasing fluid in said body thereof connected in series with the increment switch actuated by the timing motor connected to the lowering switch, the switching means of the relay in parallel to said timing motor, and a source of electrical energy.

5. A pulse operated control mechanism; adapted for use with a system having means for detecting fluctuations in a variable factor between predetermined desired upper and lower limits, and factor corrective means adapted to exert progressively accelerated corrective action on the variable factor during any departure from between the predetermined desired upper and lower limits, said factor corrective means being electrically operative; comprising a first control switch having controlled connection to the detecting means closed by fluctuations of the variable factor above the upper limit, a second control switch having controlled connection to the detecting means closed by fluctuation of the variable factor below the predetermined lower limit, a first electro-magnet having controlling connection to the factor corrective means adapted when energized to condition said corrective means to lower the variable factor, a second electro-magnet having controlling connection to the factor corrective means adapted when energized to condition said corrective means to raise the variable factor, a first electrically operated timing motor connected electrically in series with the first control switch and a source of electric energy, a second electrically operated timing motor connected electrically in series with the second control switch and a source of electric energy, a first relay having switching means and a closing coil connected with its closing coil electrically in parallel with the first timing motor, a second relay having switching means and a closing coil connected with its closing coil electrically in parallel with the second timing motor, a first timing cam rotatably driven by the first timing motor, a second timing cam rotatably driven by the second timing motor, a first increment switch mounted adjacent to the first timing cam closed for periodically spaced predetermined increments of time in response to rotation of the first cam, and a second increment switch mounted adjacent to the second timing cam closed for periodically spaced predetermined increments of time in response to rotation of the second cam, the first increment switch being connected electrically in series with the switching means of the first relay and the first electro magnet and the second increment switch being connected electrically in series with the switching means of the second relay and the second electro-magnet.

6. In a canal having a dam for impounding water therein providing adjustable means for regulating fluid flow through the dam, and a reversible electric motor connected to the fluid regulating means adapted when energized selectively to open and to close the flow regulating means and when de-energized to retain said means in adjusted condition providing a reversible switch having an opening position, a closing position and a retaining position into which it is resiliently urged; the combination of means for detecting the water level in the canal above the dam including a shaft rotatably positioned in response to fluctuations in water level; control cam means mounted on the shaft; an opening switch mounted adjacent to the cam means in controlled engagement therewith closed by rotation of said cam means a predetermined distance in response to increase of water level above the dam; a closing switch mounted adjacent to the cam means in controlled engagement therewith closed by the rotation of the cam means a predetermined distance in response to decrease of water level above the dam; an opening electro-magnet operatively associated with the reversible switch of the motor adapted when energized to move said switch into gate opening position; a closing electro-magnet operatively associated with the reversible switch adapted when energized to urge said switch into closing position; a pair of electrically operated timing motors individually connected electrically in the series with the opening and closing switches and a source of electric energy whereby each motor is actuated in response to the closing of its respective switch; a relay individual to each of the timing motors each having a closing coil and switching means connected with their closing coils electrically in parallel with their respective timing motors for concurrent actuation therewith; a timing cam rotatably driven by each motor; and an increment switch mounted adjacent to each timing cam closed in periodically spaced increments of time in response to rotation of its respective cam, the opening electro-magnet being connected in series with the increment switch operated by the cam of the timing motor connected to the opening switch and the switching means of the relay in parallel to said timing motor, and the closing electro-magnet being connected in series with the increment switch operated by the cam of the timing motor connected to the closing switch and the switching means of the relay in parallel to said timing motor.

7. In a canal having a dam adapted to impound water in the canal above the dam and providing a gate mounted for elevational movement in the dam to regulate water flow therethrough; the combination of a reversible electric motor; means interconnecting the motor and the gate whereby actuation of the motor raises and lowers the gate, the motor having a reversible switch providing a gate raising position, a gate lowering position, and an open position; a float supported on the water above the gate in the canal; a substantially horizontal shaft rotatably mounted above the float; a pulley mounted on the shaft, a flexible member connected to the float and extended upwardly over the pulley; a counterweight supported on the cable on the opposite side of the pulley from the float, whereby the flexible member is tensioned over the pulley and the shaft is rotated in the response to the fluctuations in water level above the gate; a gate raising cam mounted on the shaft; a gate lowering cam mounted on the shaft; a raising switch mounted adjacent to the raising cam in controlled engagement therewith whereby said switch is closed by rotation of the cam to a predetermined position in response to increase in water level above the gate; a lowering switch mounted adjacent to the lowering cam in controlled engagement therewith whereby said switch is closed by rotation of its cam to a predetermined position in response to the lowering of the water level above the gate; a primary raising electro-magnet operatively associated with the reversible switch of the motor adapted when energized to move said switch into gate raising position; a lowering electro-magnet operatively associated with the reversible switch adapted when energized to urge said switch into gate lowering position; an electrically operated timing motor connected electrically in series with each of the raising and lowering switches and a source of electrical energy whereby each of the timing motors is actuated in response to the closing of its respective switch in series therewith; a relay individual to each of the timing motors each having a closing coil and switching means connected with their closing coils electrically in parallel with their respective motors for concurrent actaution therewith; a timing cam having driven connection to each motor; and an increment switch mounted adjacent to each timing cam and closed in periodically spaced predetermined increments of time in response to rotation of its respective cam, the raising electro-magnet being connected in series with the increment switch operated by the timing motor connected to the raising switch and the switching means of the relay in parallel to said timing motor, and the lowering electro-magnet being connected in series with the increment switch operated by the timing motor connected to the lowering switch and the switching means of the relay in parallel to said timing motor.

8. In a canal having a dam therein adapted to impound water thereabove in the canal and providing a primary gate and a secondary gate mounted for independent elevational movement adapted to regulate water flow through the dam; the combination of reversible motor individual to each gate; means interconnecting each of the motors and its respective gate whereby actuation of the motors independently raises and lowers their respective gates, each of the motors having a reversible switch providing a gate raising position, a gate lowering position, and an open position into which it is resiliently urged and in which its motor is de-energized and its respective gate held in adjusted position; a float supported on the water above the gates in the canal; a substantially horizontal shaft rotatably mounted above the float; a pulley mounted on the shaft; a flexible member connected to the float and extended upwardly over the pulley; a counterweight mounted on the cable on the opposite side of the pulley from the float tensioning the flexible member over the pulley whereby the shaft is rotated in response to fluctuations in water level above the gates; a gate raising cam mounted on the shaft; a gate lowering cam mounted on the shaft; a primary and a secondary gate raising switch mounted adjacent to the raising cam in controlled engagement therewith, the primary raising switch being closed by rotation of the cam a predetermined distance in response to increase in water level above the gates and the secondary raising switch being successively closed by the cam in response to further rotation thereof in the same direction; a primary and a secondary gate lowering switch mounted adjacent to the lowering cam in controlled engagement therewith, the primary gate lowering switch being closed by the lowering cam in response to rotation thereof a predetermined distance in response to the lowering of the water level above the gates below a predetermined limit and the secondary lowering switch being successively closed by further rotation of the cam in the same direction; a primary raising electro-magnet operatively associated with the primary reversible switch adapted when energized to move said switch into gate raising position; a primary lowering electro-magnet operatively associated with the primary reversible switch adapted when energized to urge said switch into gate lowering position; a secondary raising electro-magnet operatively associated with the secondary reversible switch adapted when energized to urge said switch into gate raising position; a secondary gate lowering electro-magnet operatively associated with the secondary reversible switch adapted when energized to urge said reversible switch into gate lowering position; an electrically operated timing motor connected electrically in series with each of the raising and lowering switches and a source of electrical energy whereby each of the timing motors is actuated in response to the closing of its respective switch; a relay individual to each of the timing motors each having a closing coil and switching means connected with their closing coils electrically in parallel to their respective motors for concurrent actuation therewith; a timing cam connected to each timing motor; and an increment switch mounted adjacent to each timing cam closed in periodically spaced predetermined increments of time in response to rotation of its respective timing cam, the primary raising electro-magnet being connected in series with the increment switch operated by the timing motor connected to the primary raising switch and the switching means of the relay in parallel to said timing motor, the secondary raising electro-magnet being connected in series with the increment switch operated by the timing motor connected to the secondary raising switch and the switching means of the relay in parallel to said timing motor, the primary lowering electro-magnet being connected in series with the increment switch operated by the timing motor connected to the primary lowering switch and the switching means of the relay in parallel to said timing motor, and the secondary lowering electro-magnet being connected in series with the increment switch operated by the timing motor connected to the secondary lowering switch and the switching means of the relay in parallel to said timing motor.

ROY W. HEATH.

No references cited.